United States Patent
Korn et al.

(10) Patent No.: US 9,152,736 B2
(45) Date of Patent: Oct. 6, 2015

(54) EFFICIENT INDEXING AND SEARCHING OF ACCESS CONTROL LISTED DOCUMENTS

(75) Inventors: Jeffrey Korn, New York, NY (US); Ruoming Pang, New York, NY (US); David Held, Brooklyn, NY (US); Dhyanesh Harishchandra Damania, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/414,206

(22) Filed: Mar. 7, 2012

(65) Prior Publication Data

US 2012/0233176 A1    Sep. 13, 2012

Related U.S. Application Data

(60) Provisional application No. 61/452,013, filed on Mar. 11, 2011.

(51) Int. Cl.
*G06F 17/30* (2006.01)
*G06F 21/62* (2013.01)

(52) U.S. Cl.
CPC .... *G06F 17/30946* (2013.01); *G06F 17/30613* (2013.01); *G06F 21/6227* (2013.01)

(58) Field of Classification Search
CPC .............. G06F 17/30011; G06F 17/30946; G06F 17/30091; G06F 21/6227; G06F 21/62; G06F 21/6218; G06F 21/6209
USPC ......................................... 707/741, 783–786
See application file for complete search history.

(56) References Cited

U.S. PATENT DOCUMENTS

| | | | |
|---|---|---|---|
| 7,031,954 B1 | 4/2006 | Kirsch | |
| 2004/0267722 A1 | 12/2004 | Larimore et al. | |
| 2006/0047643 A1* | 3/2006 | Chaman | 707/3 |
| 2006/0080316 A1 | 4/2006 | Gilmore et al. | |
| 2006/0155705 A1* | 7/2006 | Kamper et al. | 707/8 |
| 2008/0080718 A1* | 4/2008 | Meijer et al. | 380/282 |
| 2009/0024605 A1 | 1/2009 | Yang | |
| 2009/0287692 A1 | 11/2009 | Ookuma | |
| 2009/0327043 A1 | 12/2009 | Sekhon | |
| 2009/0327271 A1 | 12/2009 | Amitay et al. | |
| 2011/0153625 A1* | 6/2011 | Komedani et al. | 707/754 |

OTHER PUBLICATIONS

Authorized Officer Myung Jin Lee, International Search Report and Written Opinion mailed Aug. 23, 2012, from counterpart International Application No. PCT/US2012/028517, 8 pages.
Authorized Officer Philippe Becamel, International Preliminary Report on Patentability, International Application No. PCT/US2012/028517, Sep. 26, 2013, 5 pages.
Extended European Search Report in European Application No. 12757104.0, mailed Aug. 19, 2014, 5 pages.

* cited by examiner

*Primary Examiner* — Alicia Willoughby
(74) *Attorney, Agent, or Firm* — Fish & Richardson P.C.

(57) ABSTRACT

Methods, systems, and apparatus, including computer programs encoded on a computer storage medium, for storing a plurality of documents in computer-readable memory, each document of the plurality of documents having a corresponding access control list (ACL), each ACL defining a plurality of users that are authorized to access a respective document, generating an index based on the plurality of users, the index comprising a plurality of partitions, each partition corresponding to a user of the plurality of users, and, for each document of the plurality of documents: ranking the users of the plurality of users, selecting a user as an indexing user based on the ranking, and storing the document in a partition of the index, the partition corresponding to the indexing user.

30 Claims, 5 Drawing Sheets

| Document | Collaborators | Owner |
|---|---|---|
| Doc1 | A, B, C | A |
| Doc2 | A, B, C | B |
| Doc3 | B, C | B |
| Doc4 | D, E | D |
| Doc5 | B, C | B |
| Doc6 | A, B, C | C |
| Doc7 | D, E, F | E |

FIG. 4A

| A | B | C | D | E | F |
|---|---|---|---|---|---|
| Doc1 | Doc3 | | Doc4 | | |
| Doc2 | Doc5 | | Doc7 | | |
| Doc6 | | | | | |

FIG. 4B

| A | B | C | D | E | F |
|---|---|---|---|---|---|
| A | A | A | D | D | D |
| | B | B | | | |

FIG. 5

| A | B | C | D | E | F |
|---|---|---|---|---|---|
| Doc1 | Doc1 | Doc1 | Doc4 | Doc4 | Doc7 |
| Doc2 | Doc2 | Doc2 | Doc7 | Doc6 | |
| Doc6 | Doc3 | Doc3 | | | |
| | Doc5 | Doc5 | | | |
| | Doc6 | Doc6 | | | |

FIG. 6

| A | B | C | D | E | F |
|---|---|---|---|---|---|
| Doc1 | Doc2 | Doc6 | Doc4 | Doc7 | |
| | Doc3 | | | | |
| | Doc5 | | | | |

FIG. 7A

| | A | B | C | D | E | F |
|---|---|---|---|---|---|---|
| | Doc1 | Doc3 | | Doc4 | | |
| | Doc2 | Doc5 | | Doc7 | | |
| | Doc6 | | | | | |

400; 402, 404, 406, 408, 410, 412

| | A' | B' | C' | D' | E' | F' |
|---|---|---|---|---|---|---|
| | | | Doc1 | | | |
| | | | Doc2 | | | |
| | | | Doc3 | | | |
| | | | Doc5 | | | |
| | | | Doc6 | | | |

| A | B | C | D | D | F |
|---|---|---|---|---|---|
| A | A | C' | D | D | D |
|   | B |   |   |   |   |

740; 742, 744, 746, 748, 750, 752

EFFICIENT INDEXING AND SEARCHING OF ACCESS CONTROL LISTED DOCUMENTS

CROSS-REFERENCE TO RELATED APPLICATIONS

This application claims the benefit of U.S. Prov. Pat. App. No. 61/452,013, filed Mar. 11, 2011, the disclosure of which is expressly incorporated herein by reference in its entirety.

BACKGROUND

This specification generally relates to indexing and searching of documents, access to which are regulated by respective access control lists (ACLs).

With collaborative documents and social networks, an increasing amount of content is stored with ACLs that specify a set of people who have access to the documents. Searching over such a corpus of documents presents certain challenges. For example, documents that one user sees may be different than documents that another user sees. This problem can be solved by adding ACL tokens to documents, each ACL token representing a user having permission to access the corresponding document. A problem with this approach, however, is that search systems must perform intersections of large hit lists, which is particularly problematic in disk-based indexing solutions. A solution for disk-based indexing systems is to write separate copies of a document to each person that has permission to them. This is referred to as write fan-out. Although this improves the efficiency of searches, the size of the index and the document write rate are greatly increased. An alternate solution includes writing a single copy of each document with ACL tokens into a sub-index (partition) corresponding to each document owner, and merging results from each collaborator of a user at search time. This is referred to as read fan-in. Although this improves efficiency of document writes, searches can end up merging a large number of result sets when users have many collaborators.

SUMMARY

Implementations of the present disclosure are directed to methods and systems for indexing and searching of access control listed (ACL'd) documents. Implementations of the present disclosure provide search indices that can be used to efficiently search ACL'ed documents, each index being partitioned into ad-hoc groups, where each document is indexed in one or more ad-hoc groups. Indexing places a document into a set of user and group partitions, and searching combines results from a set of users and group partitions. Documents can be moved or copied between partitions for more efficient search behavior In general, innovative aspects of the subject matter described in this specification may be embodied in methods that include the actions of storing a plurality of documents in computer-readable memory, each document of the plurality of documents having a corresponding access control list (ACL), each ACL defining a plurality of users that are authorized to access a respective document, generating an index based on the plurality of users, the index comprising a plurality of partitions, each partition corresponding to a user of the plurality of users, and, for each document of the plurality of documents: ranking the users of the plurality of users, selecting a user as an indexing user based on the ranking, and storing the document in a partition of the index, the partition corresponding to the indexing user.

These and other implementations may each optionally include one or more of the following features. For instance, the actions further include generating an index map based on the plurality of users, the index map including a plurality of map partitions, each map partition corresponding to a user of the plurality of users and including one or more references to respective one or more partitions of the index; wherein ranking includes: determining a plurality of user identifiers, each user identifier corresponding to a user of the plurality of users, and ranking the users based on the plurality of user identifiers; wherein ranking the users based on the plurality of user identifiers includes: for each user identifier, generating a corresponding hash value to provide a plurality of hash values, ranking the plurality of hash values in order to provide a ranking, and selecting the indexing user based on the ranking; wherein the indexing user corresponds to a minimum hash value within the ranking; wherein the indexing user corresponds to a maximum hash value within the ranking; the actions further include: generating a replicate index based on the index, the replicate index including at least one partition including one or more replicate documents, each of one or more replicate documents being a replicate of a document of the plurality of documents, and generating an index map based on the plurality of users, the index map including a plurality of map partitions, each map partition corresponding to a user of the plurality of users and including one or more references to respective one or more partitions of the index and the replicate index; the actions further include: monitoring a frequency at which a document of the plurality of documents is updated, and determining whether to replicate the document based on the frequency; the actions further include: monitoring a frequency at which one or more documents corresponding to a particular user are provided as search results, the search results being provided in response to one or more search queries, and determining whether to replicate the document based on the frequency; the actions further include: determining a re-indexing price associated with a document of the plurality of documents, the re-indexing price being determined based on one or more of document size, update timing and search frequency, comparing the re-indexing price to a price threshold, and replicating the document when the re-indexing price is less than the threshold; the actions further include: receiving input, the input corresponding to a desired re-indexing rate, and adjusting a rate at which replication of one or more documents to the replicate index occurs based on the input; and the actions further include: receiving a search query, the search query including one or more keywords and a user identity, selecting a partition of the plurality of partitions based on the user identity, searching one or more documents associated with the partition based on the one or more keywords, and generating search results based on the searching.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4A is an example index in accordance with implementations of the present disclosure.

FIG. 4B is an example partition map in accordance with implementations of the present disclosure.

FIG. 5 is an example index including partitions based on document collaborators.

FIG. 6 is an example index including partitions based on document owner.

FIG. 7A depicts an example replicate index based on the example index of FIG. 4A.

FIG. 7B depicts an example partition map based on the example index of FIG. 4A and the example replicate index of FIG. 7A.

Like reference numbers represent corresponding parts throughout.

DETAILED DESCRIPTION

The present disclosure is generally directed to restricting user access to one or more documents based on an access control list (ACL). As used herein, the term document can refer to any collaborative media such as electronic media that can be electronically viewed and/or edited by a plurality of users. Example documents can include electronically created and stored collaborative documents, such as word processing documents, spreadsheet documents, presentation documents, as well as documents associated with one or more social networking services (e.g., shared posts, images and the like).

As discussed in further detail herein, implementations of the present disclosure provide efficient indexing and searching of collaborative documents. For example, a plurality of documents can be generated and stored. Each of the plurality of documents can be access control listed (ACL'ed) such that access to each document is only provided to designated users. Techniques are provided for implementing a search index that can be used to efficiently search ACL'ed documents. The index is partitioned into per-user document sets and ad-hoc groups. Indexing places a document into a set of user and group partitions, and searching combines results from a set of users and group partitions. Documents can be moved or copied between partitions for more efficient search behavior.

Figure 1:
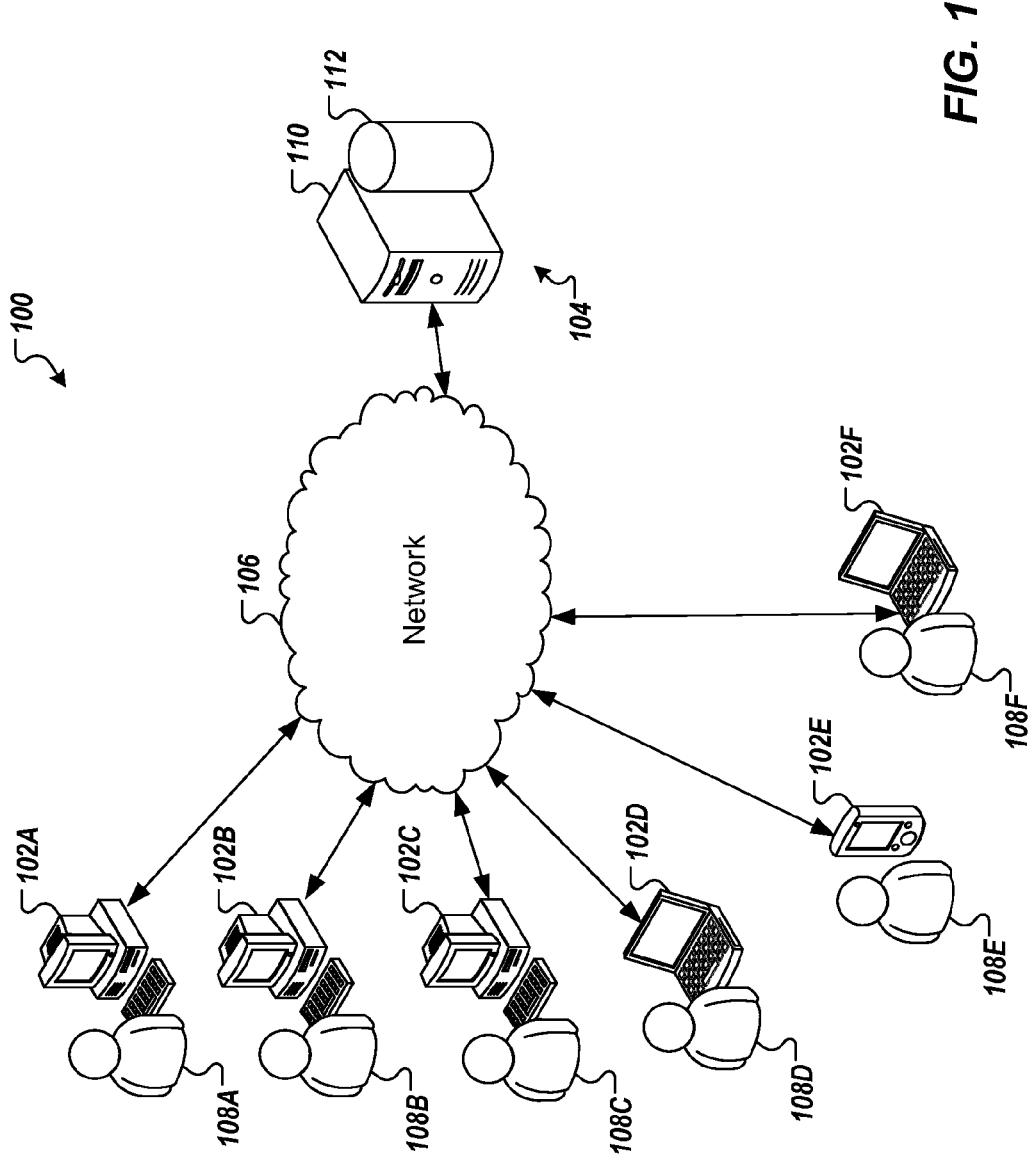
FIG. 1 depicts an example system for efficient indexing and searching of documents based on an access control list (ACL).

FIG. 1 depicts an example system 100 for efficient indexing and searching of access control listed (ACL'ed) documents. The system 100 includes computing devices 102A-102F that can each communicate with one or more server systems 104 over a network 106. Each of the computing devices 102A-102F includes an associated user 108A-108F, respectively. The network 106 can include a large computer network, such as a local area network (LAN), wide area network (WAN), the Internet, a cellular network, or a combination thereof connecting any number of mobile computing devices, fixed computing devices, and server systems. The server system 104 includes a computing device 110 and a machine-readable repository, or database 112. IT is appreciated that, although a single server system 104 is depicted, the single server system can represent one or more server systems.

In the example system 100, the computing devices 102A-102C are illustrated as desktop-type computing devices, the computing devices 102D, 102F are illustrated as laptop-type computing devices, and the computing device 102E is illustrated as a mobile computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The computing devices 102A-102F enable the respective users 108A-108F to create, access, view and/or edit documents such as collaborative documents. The documents can be electronically stored in memory. In some implementations, the documents can be stored on one or more of the computing devices 102A-102F and/or the server system 104. The computing devices 102A-102F and/or the server system 104 can communicate with one another over the network 106 to enable access to the document from any of the other computing devices 102A-102F and/or the server system 104. In some implementations, a document can be generated, accessed, viewed and/or edited by a user 108A-108F using a computer application that is executed by a respective computing device 102A-102F. In some implementations, a document can be generated, accessed, viewed and/or edited by a user 108A-108F using a computer application that is executed by the server system 104. In such an implementation, the computer application can be provided as a web-based application (web application) that is executed using the server system 104 and that receives input from and provides output to one or more of the computing devices 102A-102F over the network 106.

Figures 2, 3:
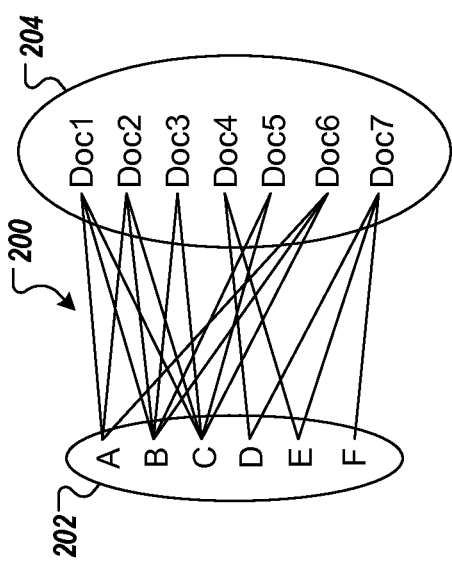
FIG. 2 depicts an example bipartite graph illustrating example access relationships between users and documents.
FIG. 3 is a table summarizing an example ACL based on the relationships depicted in FIG. 2.

FIG. 2 depicts an example bipartite graph 200 illustrating example access relationships between users 202 and documents 204. The users 202 include users A-F. For purposes of illustration, users A-F can correspond to the users 108A-108F of FIG. 1. The documents 204 include documents Doc1-Doc7. The bipartite graph 200 can be based on an example ACL that defines the relationships between the users A-F and the documents Doc1-Doc7. For example, the bipartite graph 200 provides that user A has access to documents Doc1, Doc2 and Doc6, the users B and C each have access to documents Doc1-Doc3, Doc5 and Doc6, the users D and E have access to documents Doc4 and Doc7, and the user F has access to document Doc7.

Using the document Doc1 as an example, the user A (e.g., user 108A of FIG. 1) can generate the document Doc1 using a computing device (e.g., computing device 102A of FIG. 1). The document Doc1 can be stored at the computing device and/or a server system (e.g., computing device 102A and/or server system 104 of FIG. 1). The user A can be designated as the owner of the document Doc1. In some implementations, the owner of the document is the creator of the document. The user A can designate access and access/editing rights to the document Doc1. For example, the user A can designate the user B and the user C as having access/editing rights to the document Doc1. This designation information can be provided in an ACL that records which users 202 have access/editing rights to which documents 204.

FIG. 3 is a table 300 summarizing an example ACL based on the relationships depicted in FIG. 2. The table 300 includes a Document column 302, a Collaborators column 304 and an Owner column 306. The Document column 302 and the Collaborators column 304 provide the relationships between the users 202 and the documents 204 as depicted in FIG. 2. The Owner column 306 depicts the respective owners of each of the documents. As provided in the example table 300, the user A is the owner of the document Doc1, the user B is the owner of the documents Doc1-Doc3 and Doc5, the user C is the owner of the document Doc6, the user D is the owner of the document Doc4, and the user E is the owner of the document Doc7. The user F is not designated as an owner of any of the documents Doc1-Doc7.

As noted above, each of the documents Doc1-Doc7 can be stored in computer-readable memory. An index can be generated to enable efficient searching of the stored documents to identify a relevant document based on a search query. For example, a search query can be generated by a user (e.g., one or more of users 108A-108F), and the index can be accessed based on the search query to identify one or more documents that may be relevant to the search query. A search result can be provided to the querying user, which search result can include an identification of the one or more documents. If the user is designated as having access to one or more of the one or more documents, the user can select and access a document.

Implementations of the present disclosure enable generation of an index and/or re-indexing of an existing index to provide efficient indexing and searching of documents governed by an ACL. In general, bipartite graphs, such as bipartite graph 200 of FIG. 2), are typically not random. Users already sharing documents and/or are otherwise close to each other in a bipartite graph are more likely to share documents than users that are further apart from one another. Multiple documents are often shared by the same or similar group of users. In view of this, documents can be clustered based on collaborators, such that every user can find all documents, in which they are a collaborator, in a relatively small number of clusters. In accordance with implementations of the present disclosure, a total ordering among users can be defined and a user of each shared document can be selected as the indexer for a particular document. In some implementations, and as discussed in further detail herein, a user is identified as an indexer based on a rank of the user among other users of a particular shared document. Using this methodology, a smaller number of indexers covers all documents that a user has access to. A majority of users would only need to search relatively few indexers. A small number of users, however, may need to search a larger number of indexers, which is addressed by selected replication of documents, as discussed in further detail herein. Accordingly, the indexing user for each document is selected based on a total order among users, which enables a smaller number of indexing users to cover all documents a particular user has access to.

In accordance with implementations of the present disclosure, collaborative users for a particular document are ranked based on hash values associated with each user. The hash values can be determined based on respective user identifications (user IDs) associated with the users of a particular document. For example, each user ID can be provided as input to a hash function. The hash function can be provided as a well-defined procedure or mathematical function that converts each user ID into a hash value. The hash value can be provided, for example, as an integer and can serve as an index to an array. In some implementations, the minimum hash value can be used as the index for a particular document. In some implementations, the maximum hash value can be used as the index for a particular document.

By way of a non-limiting first example, and for purposes of illustration, the users A, B, C and the documents Doc1, Doc2, Doc6 will be considered. Each of the users A, B, C can have an associated user ID (e.g., IDA, IDB, IDC). The user IDs can each be processed using a hash function to provide respective hash values (e.g., HVA, HVB, HVC). The hash values can be processed to determine one of a minimum hash value and a maximum hash value, for example. For purposes of illustration only, HVA can be less than HVB and HVC. Consequently, HVA can be deemed to be the minimum hash value, and can be selected as the index for all documents where user A is a collaborator with users B and C, as discussed in further detail below with reference to FIGS. 4A and 4B. For example, the user A can be selected as the index for documents Doc1, Doc2, Doc6, even though the user B is the owner of Doc2 and the user C is the owner of Doc6.

By way of a non-limiting second example, and for purposes of illustration, $HV_B$ can be less than $HV_C$. Consequently, $HV_B$ can be deemed to be the minimum hash value, as between the users B and C, and can be selected as the index for all documents where user B is a collaborator with user C, as discussed in further detail below with reference to FIGS. 4A and 4B. For example, the user B can be selected as the index for documents Doc3, Doc5.

FIG. 4A is an example index 400 in accordance with implementations of the present disclosure. The index 400 is based on table 300 of FIG. 3, and includes partitions 402-412. Each of the partitions 402-412 corresponds to a user (users A-F, respectively) provided as an index. Using the first example provided above, the user A can be selected as the index for documents Doc1, Doc2, Doc6, based on the hash values $HV_A$, $HV_B$, $HV_C$. Consequently, the documents Doc1, Doc2, Doc6 are saved to the partition 402, which is indexed by the user A. Using the second example provided above, the user B can be selected as the index for documents Doc3, Doc5 based on the hash values $HV_B$, $HV_C$. Consequently, the documents Doc3, Doc5 are saved to the partition 404, which is indexed by the user B. Because, in accordance with the first and second examples provided above, the user C is not selected as the index for any of the documents, in which the user C is a collaborator, the partition 406 is empty.

In FIG. 4A, the partition 408, which is indexed by the user D includes the documents Doc4, Doc7. In the example of FIG. 4A, the users E, F are not selected as the index for any of the documents, in which the users E, F are collaborators. Consequently, the partitions 410, 412 are empty. This indicates that a hash value ($HV_D$) corresponding to the user D is less than both hash values ($HV_E$, $HV_F$) corresponding to the users E, F, respectively.

FIG. 4B is an example partition map 420 in accordance with implementations of the present disclosure. Partition maps keep track of where shared documents are indexed at, and where to search for every user. In some implementations, a continuous cleaner scanlet is provided. The cleaner scanlet deletes obsolete search fan-in edges and re-index documents to reduce search fan-in. The cleaner scanlet trims sharing edges having small, infrequently updated documents and frequent searches. In some implementations, the cleaner scanlet achieves this by replicating documents. For example, if a particular document currently resides only with the creating user, and user A only has to search the creating user's index for that one document, the cleaner scanlet can copy the document from the creator user's index to user A's index and thus reduce the fan-in needed by one. In general, the partition map minimizes search-time operation and simplifies write-time operation by avoiding transactions. The cleaner scanlet can operate offline to synchronize the reader map to document sharing states. The sharing map tracks which users can read a given document and in which shared index locations the document is currently indexed. The reader map tracks for each reader, in which shared index locations they can find all documents shared with that reader.

With continued reference to FIG. 4B, the partition map 420 includes partitions 422-432, which correspond to partitions 402-412 of FIG. 4A. The partition map 420 maps which partitions to fan-in. That is, the partition map 420 maps which partitions 402-412 of the index 400 to construct the list of documents corresponding to each user. For example, the partition 422 corresponds to the user A and includes a corresponding fan-in designation A. This indicates that the documents saved in the partition 402 are to be fanned into the partition 422. As another example, the partition 424 corresponds to the user B and includes corresponding fan-in designations A, B. This indicates that the documents saved in the partitions 402, 404 are to be fanned into the partition 422. Accordingly, the documents Doc1, Doc2, Doc3, Doc5, Doc6 are fanned into the partition 422, which corresponds to the documents that the user B is a collaborator on (see FIGS. 2 and 3). As another example, the partition 426 corresponds to the user C and includes corresponding fan-in designations A, B. This indicates that the documents saved in the partitions 402, 404 are to be fanned into the partition 426. Accordingly, the documents Doc1, Doc2, Doc3, Doc5, Doc6 are fanned into the partition 426, which corresponds to the documents that the user C is a collaborator on (see FIGS. 2 and 3).

The efficiency of indexing in accordance with FIGS. 4A and 4B will be discussed in further detail below with respect to traditional indexing techniques.

FIG. 5 is an example index 500 including partitions 502-512 based on document collaborators. In accordance with this technique, which can be referred to as a write fan-out approach, a separate copy of each document is stored for each user that has access to the document. Using the example of FIGS. 2 and 3, the partition 502 includes the documents Doc1, Doc2, Doc6, which the user A is a collaborator on. The partitions 504, 506 each include the documents Doc1, Doc2, Doc3, Doc5, Doc6, which the users B, C are collaborators on. The partitions 508, 510 each include the documents Doc4, Doc7, which the users D, E are collaborators on, and the partition 512 includes the document Doc7, which the user F is a collaborator on.

Although the collaborator-based indexing technique illustrated in FIG. 5 provides for efficient searching, the size of the index and the document write rate are greatly increased. For example, and the index 400 of FIG. 4A includes seven documents, while the index 500 of FIG. 5 includes eighteen documents. This is compounded as the number of collaborators and the number of documents increase.

FIG. 6 is an example index 600 including partitions 602-612 based on document owner. In accordance with this technique, which can be referred to as a read fan-in approach, a single copy of each document is written into a partition corresponding to each document owner, and search results are merged together from each collaborator of a user at search time. Although this technique is efficient for writes (e.g., the index 600 of FIG. 6 includes seven documents, while the index 500 of FIG. 5 includes eighteen documents), searches can end up having to merge a large number of result sets when users have many collaborators.

Implementations of the user rank-based indexing discussed herein provides good document distribution for most users. It is appreciated, however, that a small number of users may still have large search fan-ins. To address such a scenario, a small set of documents can be replicated at multiple index locations to limit search fan-in for all users. That is, search fan-in can be improved by selectively replicating a small subset of documents to multiple indices. In some implementations, replication is done asynchronously using a background process. In some implementations, search fan-in can be further improved based on the selection the user ordering.

In some implementations, search fan-in can be limited to a threshold (e.g., 10). In cases where a search fan-in exceeds the threshold, index locations having the smallest total document sizes can be selected and all of the documents from those locations are replicated to the searcher's own index location. Such implementations can be described as a simple fan-in limit.

In some implementations, and as an alternative to the simple fan-in limit described above, dynamic document replication can be provided. In particular, update timing of documents can be collected, and the next update time per document can be estimated. In this manner, better decisions on whether it is worthwhile to replicate a document can be made. For example, if a document is estimated to update frequently and/or relatively soon (e.g., within a threshold time), replication of that document may be foregone. Further, search timing of users can be collected, and search frequency can be estimated. In this manner, frequent searchers can be identified, and the search fan-in corresponding to frequent searchers can be more aggressively reduced than less frequent searchers.

In some implementations, a re-indexing price is provided, which represents the cost-benefit ratio of whether to remove a fan-in through replication. The re-indexing price can be determined based on document size, update timing and search frequency. A dynamic price threshold can be provided. The re-indexing price can be compared to the corresponding price threshold to determine whether to replicate documents. For example, if the re-indexing price is greater than the price threshold, the documents are not replicated.

In some implementations, a control is provided to regulate a total re-indexing rate. The total re-indexing rate can correspond to the total bandwidth spent on replication. The control can be used to adjust the price threshold, discussed above, to satisfy a bandwidth limit. In this manner, the impact of replication traffic can be controlled, and off-peak time when documents are less frequently updated (e.g., nights and weekends) can be utilized for more aggressive replication. A search fan-in threshold can be provided to bound the worst case fan-in. The threshold overrides the price threshold for big readers, although prices are still used to rank fan-in edges of the reader and select edges to remove. In some implementations, big readers are users who have a very large fan-in (e.g., greater than some threshold). The fan-in edges of a user are provided as the number of other user indexes that need to be accessed to see all documents that have been shared with/by that user.

The price threshold represents a cost vs. benefit analysis of replicating a document. The price is computed from document size, update timing and the reader's search frequency. For example, if a document is updated frequently, the cost of replicating it is high since the benefit will be lost once it is updated again. A rarely updated document which is small and searched frequently can be cheaply replicated for high benefit.

FIG. 7A depicts an example replicate index 700 based on the example index 400 of FIG. 4A. The replicate index 700 includes partitions 702-712, which correspond to partitions 402-412 of example index 400. The example replicate index 700 includes replicates of Doc1, Doc2, Doc3, Doc5, Doc6 in partition 706, which corresponds to a write fan-in of the documents in partitions 402, 404 of example index 400, per the partition map 420 od FIG. 4B. FIG. 7B depicts an example partition map 740 based on the example index 400 of FIG. 4A and the example replicate index 700 of FIG. 7A. The partition map 740 includes partitions 742-752 that correspond to partitions 402-412 of index 400.

The indices 400, 700 can be implemented to provide search results based on a search query entered by a user. An example search query can include one or more keywords and a user identity. In this manner, a corresponding search engine can process the search query to identify documents, to which the identified user has access, and which include the one or more search queries. A partition map (e.g., partition map 740 of FIG. 7A) can be used to determine which partition of an index corresponds to the identified user (e.g., partitions 402-412 of the index 400 and/or partitions 702-712 of the replicate index 700 of FIG. 7A). Documents within a partition can be searched based on the one or more keywords and search results can be generated that include documents that are associated with the identified user and that include one or more keywords of the one or more keywords.

By way of non-limiting example, a search query can include "user B" and "keyword." A search engine can receive the search query as input and can access the partition map 740 of FIG. 7B based on user B. In this case, user B corresponds to partition 744, which identifies documents associated with users A and B in the index 400 of FIGS. 4A and 7B to be fanned in. Consequently, the document set including Doc1, Doc2, Doc3, Doc5 and Doc6 can be searched based on keyword to identify any documents within this document set that include keyword. Any documents within this document set that include keyword can be provided in the search result.

Figure 8:
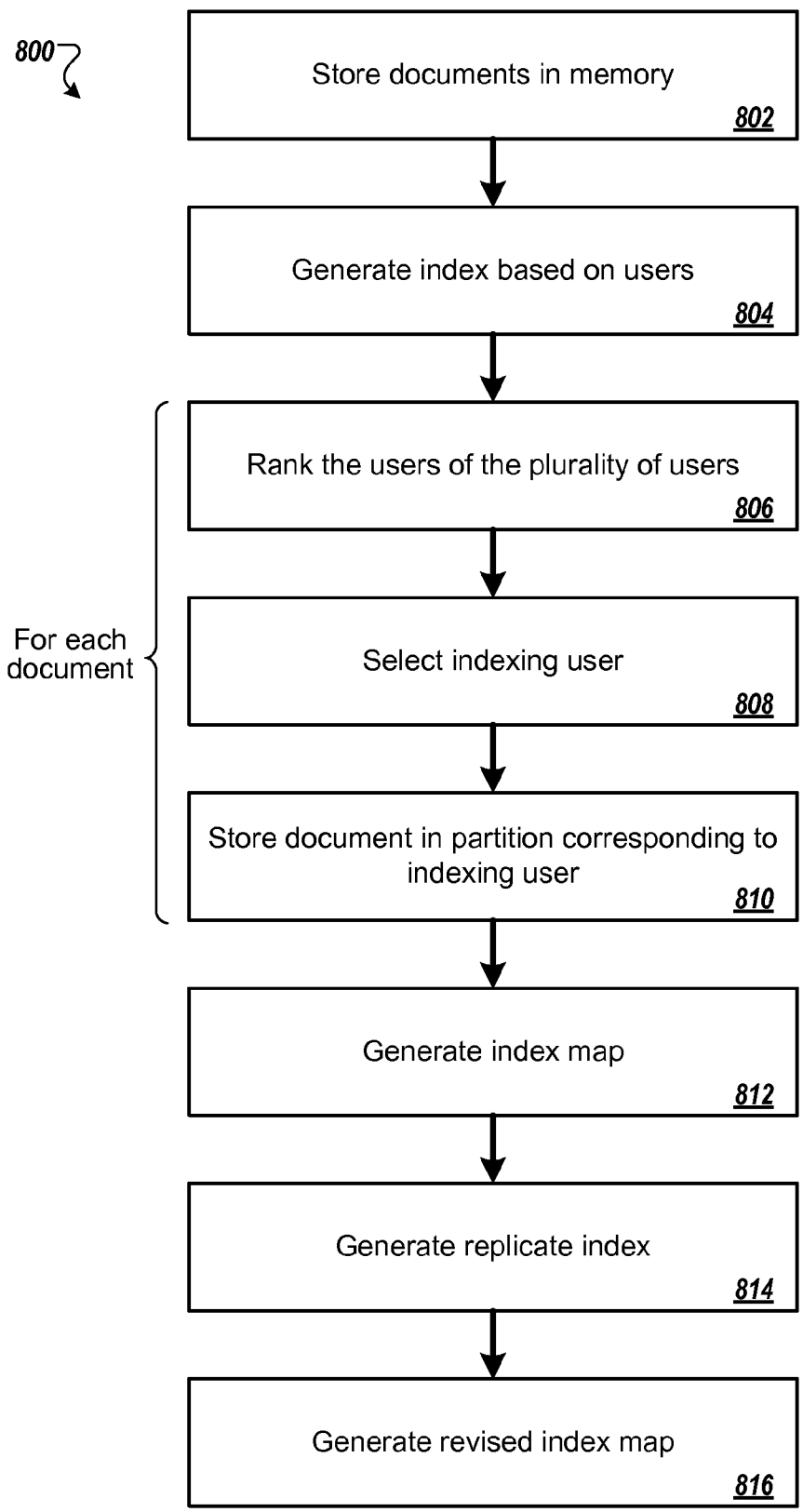
FIG. 8 is a flowchart of an example process for efficient indexing and searching of access control listed documents.

FIG. 8 is a flowchart of an example process 800 for efficient indexing of access control listed documents. A plurality of documents are stored in computer-readable memory (802). For example, the server system 104 of FIG. 1 can store the plurality of documents. Each document of the plurality of documents has a corresponding ACL, and each ACL defines a plurality of users that are authorized to access a respective document. An index is generated based on the plurality of users (804). For example, the server system 104 of FIG. 1 can generate the index based on the plurality of users. The index includes a plurality of partitions, each partition corresponding to a user of the plurality of users (e.g., index 400 of FIG. 4A). For each document of the plurality of documents, the users of the plurality of users are ranked (806), a user is selected as an indexing user based on the ranking (808), and the document is stored in a partition of the index (810), the partition corresponding to the indexing user. For example, the server system 104 of FIG. 1 can, for each document of the plurality of documents, rank the users of the plurality of users, select a user as the indexing user based on the ranking, and store the document in a partition of the index. An index map is generated based on the plurality of users (812). For example, the server system 104 of FIG. 1 can generate the index map. The index map includes a plurality of map partitions, each map partition corresponding to a user of the plurality of users and comprising one or more references to respective one or more partitions of the index.

A replicate index is generated based on the index (814). For example, the server system 104 of FIG. 1 can generate the replicate index based on the index. The replicate index includes at least one partition including one or more replicate documents, each of one or more replicate documents being a replicate of a document of the plurality of documents. A revised index map is generated based on the index and the replicate index (816). For example, the server system 104 of FIG. 4A can generate the revised index map (e.g., index map 740 of FIG. 7B).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
    one or more processors; and
    a computer-readable storage medium that is coupled to the one or more processors and that has instructions stored thereon which, when executed by the one or more processors, cause the one or more processors to perform operations comprising:
        storing a plurality of documents in computer-readable memory, each document of the plurality of documents having a corresponding access control list (ACL) associated therewith, each ACL defining a plurality of users that are authorized to access a respective document;
        generating an index based on the plurality of users, the index comprising a plurality of partitions, each partition corresponding to a user of the plurality of users; and
        for each document of the plurality of documents:
            ranking the users of the plurality of users by:
                for each user identifier, generating a corresponding hash value to provide a plurality of hash values;
                ranking the plurality of hash values in order to provide a ranking; and
                selecting an indexing user based on the ranking;
            storing content of the document in a partition of the index, the partition corresponding to the indexing user.

2. The system of claim 1, the operations further comprising generating an index map based on the plurality of users, the index map comprising a plurality of map partitions, each map partition corresponding to a user of the plurality of users and comprising one or more references to respective one or more partitions of the index.

3. The system of claim 1, wherein the indexing user corresponds to a minimum hash value within the ranking.

4. The system of claim 1, wherein the indexing user corresponds to a maximum hash value within the ranking.

5. The system of claim 1, the operations further comprising:
    generating a replicate index based on the index, the replicate index comprising at least one partition including one or more replicate documents, each of one or more replicate documents being a replicate of a document of the plurality of documents; and
    generating an index map based on the plurality of users, the index map comprising a plurality of map partitions, each map partition corresponding to a user of the plurality of users and comprising one or more references to respective one or more partitions of the index and the replicate index.

6. The system of claim 5, the operations further comprising:
    monitoring a frequency at which a document of the plurality of documents is updated; and
    determining whether to replicate the document based on the frequency.

7. The system of claim 5, the operations further comprising:
    monitoring a frequency at which one or more documents corresponding to a particular user are provided as search results, the search results being provided in response to one or more search queries; and
    determining whether to replicate the document based on the frequency.

8. The system of claim 5, the operations further comprising:
    determining a re-indexing price associated with a document of the plurality of documents, the re-indexing price being determined based on one or more of document size, update timing and search frequency;
    comparing the re-indexing price to a price threshold; and
    replicating the document when the re-indexing price is less than the threshold.

9. The system of claim 5, the operations further comprising:
    receiving input, the input corresponding to a desired re-indexing rate;
    adjusting a rate at which replication of one or more documents to the replicate index occurs based on the input.

10. The system of claim 1, the operations further comprising:
  receiving a search query, the search query comprising one or more keywords and a user identity;
  selecting a partition of the plurality of partitions based on the user identity;
  searching one or more documents associated with the partition based on the one or more keywords; and
  providing search results based on the searching.

11. A non-transitory computer-readable storage medium coupled to one or more processors having instructions stored thereon which, when executed by the one or more processors, cause the one or more processors to perform operations comprising:
  storing a plurality of documents in computer-readable memory, each document of the plurality of documents having a corresponding access control list (ACL) associated therewith, each ACL defining a plurality of users that are authorized to access a respective document;
  generating an index based on the plurality of users, the index comprising a plurality of partitions, each partition corresponding to a user of the plurality of users; and
  for each document of the plurality of documents:
    ranking the users of the plurality of users by:
      for each user identifier, generating a corresponding hash value to provide a plurality of hash values;
      ranking the plurality of hash values in order to provide a ranking; and
      selecting the indexing user based on the ranking;
    storing content of the document in a partition of the index, the partition corresponding to the indexing user.

12. The storage medium of claim 11, the operations further comprising generating an index map based on the plurality of users, the index map comprising a plurality of map partitions, each map partition corresponding to a user of the plurality of users and comprising one or more references to respective one or more partitions of the index.

13. The storage medium of claim 11, wherein the indexing user corresponds to a minimum hash value within the ranking.

14. The storage medium of claim 11, wherein the indexing user corresponds to a maximum hash value within the ranking.

15. The storage medium of claim 11, the operations further comprising:
  generating a replicate index based on the index, the replicate index comprising at least one partition including one or more replicate documents, each of one or more replicate documents being a replicate of a document of the plurality of documents; and
  generating an index map based on the plurality of users, the index map comprising a plurality of map partitions, each map partition corresponding to a user of the plurality of users and comprising one or more references to respective one or more partitions of the index and the replicate index.

16. The storage medium of claim 15, the operations further comprising:
  monitoring a frequency at which a document of the plurality of documents is updated; and
  determining whether to replicate the document based on the frequency.

17. The storage medium of claim 15, the operations further comprising:
  monitoring a frequency at which one or more documents corresponding to a particular user are provided as search results, the search results being provided in response to one or more search queries; and
  determining whether to replicate the document based on the frequency.

18. The storage medium of claim 15, the operations further comprising:
  determining a re-indexing price associated with a document of the plurality of documents, the re-indexing price being determined based on one or more of document size, update timing and search frequency;
  comparing the re-indexing price to a price threshold; and
  replicating the document when the re-indexing price is less than the threshold.

19. The storage medium of claim 15, the operations further comprising:
  receiving input, the input corresponding to a desired re-indexing rate;
  adjusting a rate at which replication of one or more documents to the replicate index occurs based on the input.

20. The storage medium of claim 11, the operations further comprising:
  receiving a search query, the search query comprising one or more keywords and a user identity;
  selecting a partition of the plurality of partitions based on the user identity;
  searching one or more documents associated with the partition based on the one or more keywords; and
  generating search results based on the searching.

21. A computer-implemented method, comprising:
  storing, by one or more processors, a plurality of documents in computer-readable memory, each document of the plurality of documents having a corresponding access control list (ACL) associated therewith, each ACL defining a plurality of users that are authorized to access a respective document;
  generating, by the one or more processors, an index based on the plurality of users, the index comprising a plurality of partitions, each partition corresponding to a user of the plurality of users; and
  for each document of the plurality of documents:
    ranking the users of the plurality of users by:
      for each user identifier, generating a corresponding hash value to provide a plurality of hash values;
      ranking the plurality of hash values in order to provide a ranking; and
      selecting the indexing user based on the ranking;
    storing content of the document in a partition of the index, the partition corresponding to the indexing user.

22. The method of claim 21, further comprising generating an index map based on the plurality of users, the index map comprising a plurality of map partitions, each map partition corresponding to a user of the plurality of users and comprising one or more references to respective one or more partitions of the index.

23. The method of claim 21, wherein the indexing user corresponds to a minimum hash value within the ranking.

24. The method of claim 21, wherein the indexing user corresponds to a maximum hash value within the ranking.

25. The method of claim 21, further comprising:
  generating a replicate index based on the index, the replicate index comprising at least one partition including one or more replicate documents, each of one or more replicate documents being a replicate of a document of the plurality of documents; and
  generating an index map based on the plurality of users, the index map comprising a plurality of map partitions, each map partition corresponding to a user of the plurality of users and comprising one or more references to respective one or more partitions of the index and the replicate index.

26. The method of claim 25, further comprising:
monitoring a frequency at which a document of the plurality of documents is updated; and
determining whether to replicate the document based on the frequency.

27. The method of claim 25 further comprising:
monitoring a frequency at which one or more documents corresponding to a particular user are provided as search results, the search results being provided in response to one or more search queries; and
determining whether to replicate the document based on the frequency.

28. The method of claim 25, further comprising:
determining a re-indexing price associated with a document of the plurality of documents, the re-indexing price being determined based on one or more of document size, update timing and search frequency;
comparing the re-indexing price to a price threshold; and
replicating the document when the re-indexing price is less than the threshold.

29. The method of claim 25, further comprising:
receiving input, the input corresponding to a desired re-indexing rate;
adjusting a rate at which replication of one or more documents to the replicate index occurs based on the input.

30. The method of claim 21, further comprising:
receiving a search query, the search query comprising one or more keywords and a user identity;
selecting a partition of the plurality of partitions based on the user identity;
searching one or more documents associated with the partition based on the one or more keywords; and
generating search results based on the searching.

* * * * *